H. HITCHCOCK.
VALVE.
APPLICATION FILED MAR. 20, 1911.
1,043,935. Patented Nov. 12, 1912.
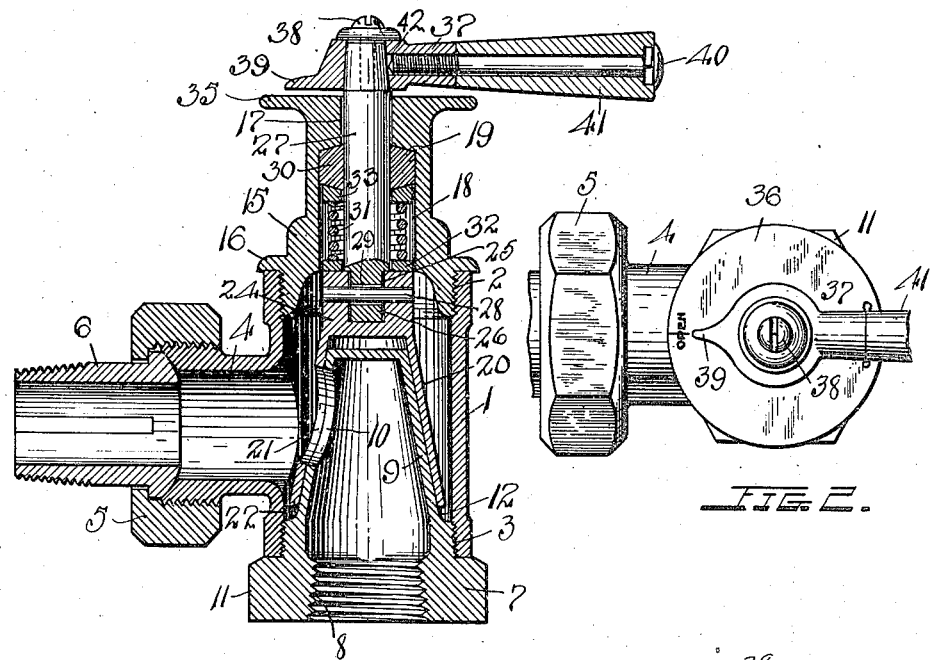
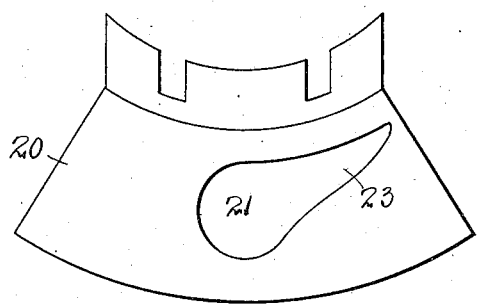
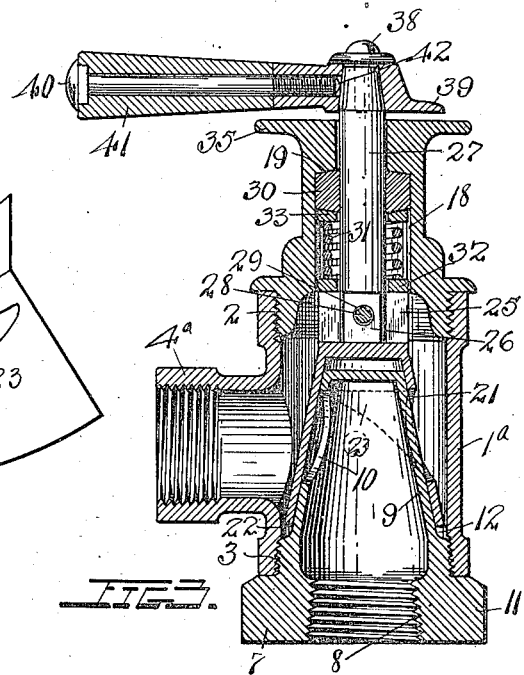
Witnesses.
Oliver M. Kappler
Brennan B. West.
Inventor
Harlyn Hitchcock.
By Hull & Smith
Attys

UNITED STATES PATENT OFFICE.

HARLYN HITCHCOCK, OF ATLANTA, GEORGIA.

VALVE.

1,043,935.  Specification of Letters Patent.  Patented Nov. 12, 1912.

Application filed March 20, 1911. Serial No. 615,802.

*To all whom it may concern:*

Be it known that I, HARLYN HITCHCOCK, a citizen of the United States, residing at Atlanta, in the county of Fulton and State of Georgia, have invented a certain new and useful Improvement in Valves, of which the following is a full, clear, and exact description, reference being had to the accompanying drawings.

This invention relates to valves and especially to the type known as "radiator valves".

The objects of the invention are to provide a device of this character which can be assembled and disassembled with the least possible disturbance of the line of pipe; the provision of a valve having a sufficiently loose connection between the valve member and stem to permit the accurate seating of the former at all times without necessitating their exact alinement; the dispensing with a stuffing box; the provision of improved means for maintaining fluid tight joints between the valve and seat and about the stem; and the provision of an indicating device of improved and simplified type and in which the handle can be set so as to indicate correctly upon a scale or index the relative positions of the ports in the valve and valve seat.

Generally speaking, the invention may be defined as consisting of the combination of elements embodied in the claims hereto annexed and illustrated in the drawings forming part hereof, in which:

Figure 1 is a vertical cross sectional view of one embodiment of my improved valve, showing the same in open position; Fig. 2 is a top plan view of the same; Fig. 3 is a vertical cross sectional view of a valve made in accordance with my invention and embodying a slightly modified valve casing, the valve being illustrated in closed position; and Fig. 4 represents a development of the valve member.

Describing the parts by reference characters, 1 indicates the body or casing of my improved valve, which is made in the form of a T, having alined threaded openings 2 and 3, and a transversely extending pipe connection 4. In Fig. 1 this connection is illustrated as formed with external threads adapted to receive a gland nut 5 by means of which a connecting nipple 6 may be secured thereto. Threaded into the opening 3 is a bushing 7, having an internal pipe receiving thread 8 and an upwardly projecting truncated conical portion 9 forming a valve seat and having in its side a port or opening 10. This bushing is preferably formed with an enlarged prismatic portion 11 adapted to abut against the lower end of the casing 1, and the base of the conical portion is spaced inwardly from the wall of the casing so as to provide a recess 12. The port 10 is preferably arranged to come opposite the transverse connection 4, although it is obvious that the valve would be entirely operative with other arrangements of this port.

Threaded into the opening 2 is a bonnet 15, having a lateral flange 16 abutting against the upper end of the casing 1, and having an axial perforation 17 adapted to receive the valve stem. The lower end of said bonnet is hollowed out as at 18, defining a rather abrupt shoulder 19.

The valve member proper comprises a hollow, truncated conical sleeve 20 adapted to embrace closely the conical portion 9, and having in its side a port 21 adapted to register with the port 10. The lower end of said sleeve is terminated short of the lower end of the conical portion 9 as indicated at 22 and the smallest diameter of the interior of said sleeve is slightly less than the smallest diameter of the conical portion. The port 21 is preferably formed of the shape shown in Fig. 4 and comprises a substantially circular opening merging with a tapered or diminishing notch 23. The smaller end of said sleeve is formed with an integral cylindrical extension 24 having therein a transverse notch or slot 25, loosely receiving the flattened end 26 of a valve stem 27 which is loosely attached thereto by means of a pin or rivet 28 secured in the sides of the extension 24. The perforation 29 formed in the stem and through which the pin passes is made somewhat larger than the pin so as to permit a certain degree of universal movement between the stem and valve member.

Carried within the enlarged hollowed-out portion of the bonnet and surrounding the stem is a packing 30 of rubber, vegetable fibers or other suitable material, and said packing is forced against the shoulder 19 by means of a spiral spring 31 compressed between a washer 32 mounted upon the squared upper end of the valve member and a washer 33 engaging the packing. It will thus be seen that said spring serves at the same time to hold the valve member securely to its seat and to compress the packing tightly around the valve stem.

The upper end of the bonnet is preferably formed with a laterally extending flange 35 defining a flat circular surface 36, which surface is preferably provided with words or characters denoting the position of the valve with respect to the seat, the words "Open" and "Closed" being employed in the drawings. The upper end of the stem is preferably provided with a conical end projecting above the seat, and upon this end is secured a handle 37. Said handle is secured in adjusted position upon the valve stem by means of a screw 38 or other suitable means, and the conical shape of the stem permits the handle to be adjusted therearound so as to bring the indicating finger 39 thereof into correct relation to the port and the valve member. The position of the handle upon the stem is further assured by means of the radial screw 40 which holds the wood or other non-conducting hand piece 41 in place, and is provided with a conical point 42 adapted to press against the side of the stem.

In Fig. 3 I have illustrated a modification of my valve in which the casing consists of a simple T shaped connection which may conveniently be an ordinary malleable iron, stock T, the remaining parts being the same as those illustrated in Fig. 1. The comparative freedom of the joint between the valve member and the stem permits the relative movement necessary to compensate for the difference in direction and alinement between the two ends of the T.

I consider my method of attaching the valve handle to the stem as important because of the great difficulty, if not impossibility, of making valves of this type in which the relation of the port 10 and indicator plate 36 shall be uniform. Such uniformity would require the same length of screw threads in all cases and the starting of said screw threads at the same points. My arrangement permits the handle to be affixed to the stem so as to indicate accurately the relation of the port and the valve to each other. Attention is also called to the recess 12 surrounding the valve seat below the valve, and forming a pocket into which grit and sediment may fall and be prevented from interfering with the operation of the valve.

While I have necessarily described my invention in detail, I do not propose to be limited to such details except as the same may be positively included in the claims hereto annexed or may be rendered necessary by the prior state of the art.

Having thus described my invention, what I claim is:

1. A valve comprising, in combination, a casing having substantially alined threaded openings in the ends thereof and a lateral pipe connection between said ends, a bushing threaded into one of said openings and having a valve seat secured to its inner end, said valve seat having a port therethrough and said bushing having a pipe receiving opening, a valve member fitting against said seat and having a port therein adapted to register with said first port, said valve member having an axial extension at one end concentric with said casing, an apertured bonnet secured in the other of said openings, said bonnet member being hollowed out at its lower end, a stem projecting through said bonnet and connected to said extension, packing in said hollowed portion surrounding said stem, a washer surrounding said stem and bearing against said packing, a washer surrounding said stem and seated against said extension, a spring compressed between said washers, and a handle secured to the outer end of said stem.

2. A valve comprising, in combination, a casing consisting of a standard pipe T having substantially alined threaded openings in the ends thereof and a lateral pipe connection between said ends, an externally threaded bushing secured in one of said openings and having an inwardly extending frusto-conical valve seat upon its inner end, the largest diameter of said conical portion being less than the internal diameter of the casing and said conical portion having a port in its side wall, a frusto-conical sleeve fitting over said seat and having its end spaced from the base of said seat, said sleeve having a port therein adapted to register with said first port and having an axial projection, an apertured bonnet member secured in the other of said openings, said bonnet member being hollowed out at its lower end, a stem projecting through said bonnet and secured to said projection, packing in said hollowed portion surrounding said stem, a washer bearing against said packing, a washer seated on said extension, a spring compressed between said washers, and a handle secured to the outer end of said stem.

3. A valve comprising, in combination, a casing having substantially alined threaded openings in the ends thereof and a lateral pipe connection between said ends, an externally threaded bushing secured in one of said openings and having an inwardly extending frusto-conical valve seat upon its inner end, the largest diameter of said conical portion being less than the internal diameter of the casing and said conical portion having a port in its side wall, a frusto-conical sleeve fitting over said seat and having its end spaced from the base of said seat, said sleeve having a port therein adapted to register with said first port and having an axial slotted projection, an apertured bonnet member secured in the other of said openings, said bonnet member being hollowed out at its lower end, a stem projecting through said bonnet and having a flattened end received in said slot, means loosely retaining said stem in said slot, packing in said hollowed portions surrounding said stem, a washer bearing against said packing, a washer seated on said extension, a spring compressed between said washers, and a handle secured to the outer end of said stem.

4. A valve comprising, in combination, a casing having substantially alined threaded openings in the ends thereof and a lateral pipe connection between said ends, a valve seat threaded into one of said openings and having a port therethrough, a rotatable valve member engaging said seat and having a port therein adapted to register with said first port, an apertured bonnet member secured in the other of said openings, and having a flat upper end formed with indicating designations on its surface, a stem secured to said valve member and projecting through said bonnet and having a conical outer end, and a handle adapted to be secured in any angular position about said stem, said handle having an indicating finger to coöperate with said indicating designations, and having a radial set screw carrying on its shank a sleeve of non-conducting material and having a point adapted to engage the end of said stem.

In testimony whereof, I hereunto affix my signature in the presence of two witnesses.

HARLYN HITCHCOCK.

Witnesses:
E. J. JACKSON,
A. J. HANSELL.